UNITED STATES PATENT OFFICE.

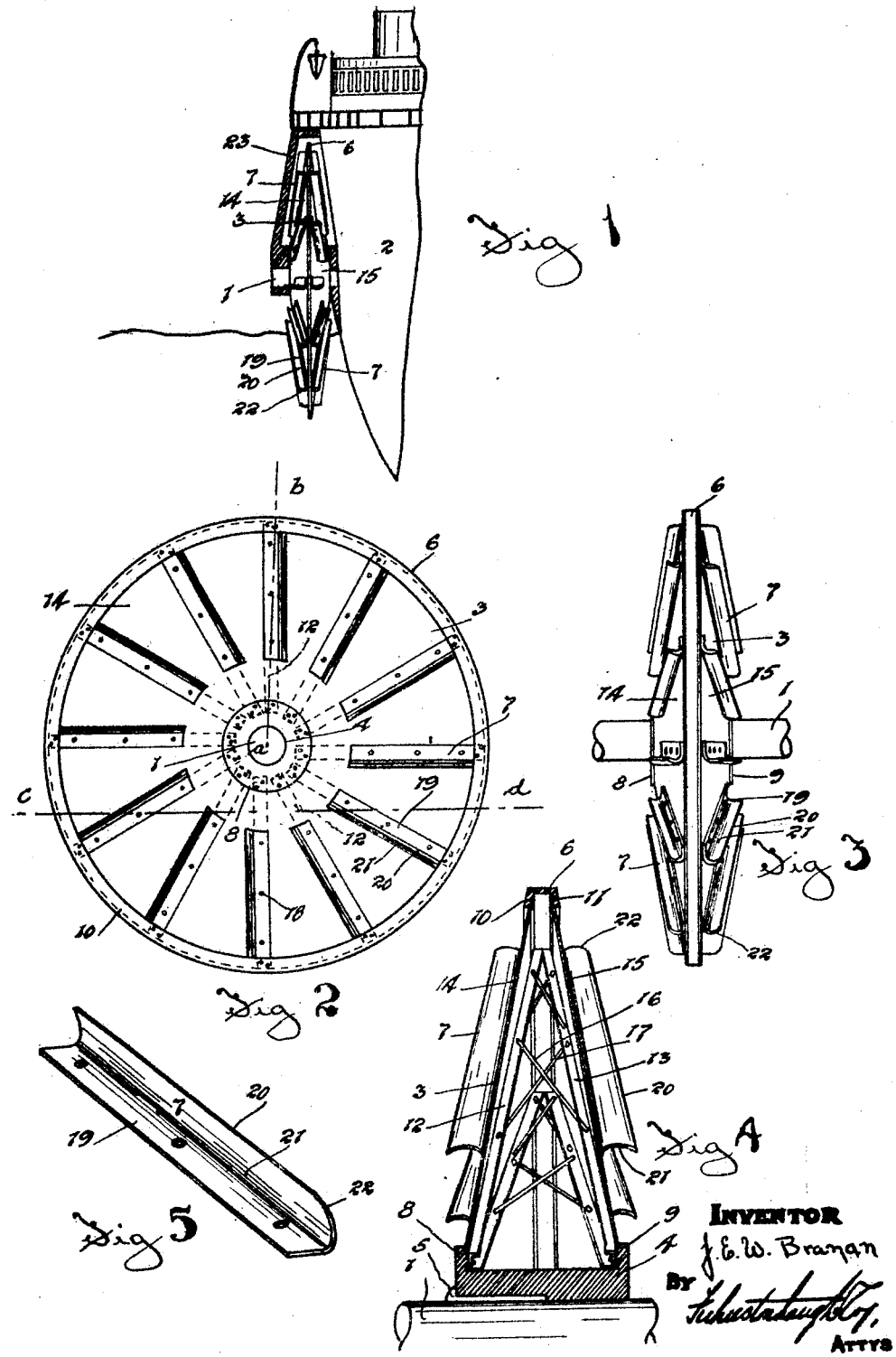

JOHN EDMOND WALLACE BRANAN, OF WINNIPEG, MANITOBA, CANADA.

WATER-WHEEL.

1,367,532.     Specification of Letters Patent.     Patented Feb. 8, 1921.

Application filed July 17, 1918. Serial No. 245,371.

*To all whom it may concern:*

Be it known that I, JOHN EDMOND WALLACE BRANAN, of the city of Winnipeg, in the Province of Manitoba, Canada, have invented certain new and useful Improvements in Water-Wheels, of which the following is the specification.

The invention relates to improvements in water wheels particularly adapted for use as a driving wheel for boats and the object of the invention is to construct an improved style of wheel having large paddle area and with the paddles arranged so that they dip into and leave the water with very little splashing.

A further object of the invention is to construct the body of the wheel so that it will cut through the water and such that the pressures on the sides of the wheel are equalized and further such that when the wheel is in operation there will be a minimum amount of churning of the water in which the wheel is immersed.

A further object of the invention is to construct the wheel in a light but strong manner so that water is excluded from the interior of the wheel.

A still further object is to arrange the paddles so that they will drain readily after leaving the water.

With the above more important objects in view the invention consists essentially in an inclosed wheel frame having the sides thereof oppositely coned between the rim and the hub and angle paddles secured to the opposite sides of the wheel and passing inwardly from the rim toward the center of the wheel but slightly non-radial, the parts being arranged and constructed as hereinafter more particularly described and later pointed out in the appended claims, reference being had to the accompanying drawing, in which:—

Figure 1 represents a side view of the wheel as it appears at the side of the boat hull.

Fig. 2 represents an enlarged detailed side view of the wheel.

Fig. 3 represents a front view of the wheel.

Fig. 4 represents an enlarged detailed sectional view through the upper half of the wheel.

Fig. 5 represents a perspective view of one of the paddles.

In the drawing like characters of reference indicate corresponding parts in the several figures.

1 represents a driving shaft which is shown in the present instance as the water wheel shaft extending from the side of the boat hull 2. On this shaft I mount my wheel 3, the hub 4 of which is securely fastened such as by a key 5 to the shaft.

The wheel presents an inclosed frame constructed so that the sides are oppositely coned between the rim 6 and the hub and to the sides of the wheel I permanently secure the paddles 7. The wheel frame is constructed in the present instance in the following manner.

The hub 4 of the wheel is fitted with a pair of opposing flanges 8 and 9 and the rim is formed from a channel iron member which presents opposing flanges 10 and 11. Between the hub and the rim I insert pairs of angle bars 12 and 13 which are permanently riveted to the flanges of the rim and hub and form a framework to which I secure inclosing sheet metal side pieces 14 and 15 which extend between the hub and the rim and inclose the sides of the wheel. The pairs of angle irons are cross braced by inserted cross braces 16 and 17 which effectively reinforce the structure against collapse.

In actual practice I desire to place the pairs of angle irons in a slightly non-radial position, that is to say, with their outer ends all spaced an equal distance apart in respect to the rim and their inner end advanced slightly in respect to the true radial position from the hub. This arrangement is best shown in Fig. 2 where *a—b* represents a line radiating from the center of the hub to the rim and having the outer end passing centrally of the outer end of one of the angle bars.

To the sides of the wheel I secure as hereinbefore stated the paddles 7 and these are fastened such as by rivets as indicated at 18, through the sides of the wheel, to the angle iron frame and the said paddles are alined with the angle irons with the result that they are in a slightly non-radial position.

The blades are all of the same construction, each presenting a fastening wing 19 and a propelling wing 20, the propelling wing being positioned at right angles to the wing 19 but being dished so that it is slightly trough or scoop shaped as indicated at 21. The outer ends of the wings 20 are rounded off as shown at 22 so that they will cut into the water and the inner ends of the paddles terminate somewhat outside what might be called the water line as indicated at c—d. When the wheel is applied on a boat the upper half thereof is inclosed as indicated at 23.

By coning the sides of the wheel I provide comparatively long blades and the arrangement makes the paddle wheels less conspicuous on the boat hull as the upper part of the wheel is narrow and allows the casing 23 to be built as a non-prominent bulge at the side of the boat rather than a full width bulge consistent with the width of the hub for the full height of the wheel. The cone shape also allows the wheel to cut its way into the water as the boat advances and in this connection it is pointed out that if the wheel were drum shaped there would be a comparatively wide exposed area positioned at right angles to the direction of travel which would act as a lag owing to the pressure of the water on the wheel.

By placing the blades in the non-radial position shown the outer tips of the blades are advanced so that they dip into and leave the water quicker than they would if in a radial position, and the water has not such a tendency to escape from the dipping ends of the blades and not such a tendency to splash from the up-going ends of the blades.

Further by placing them in the manner shown the propelling force of the blades is increased as the entering blade has a greater angular position in respect to the water when entering than it would have radially placed.

Further the water clinging to the rising blades drains back in the trough shaped wing to the center of the wheel so that there is very little splashing.

Obviously owing to the fact that the body of the wheel is inclosed no water can get in and there is on this account no dripping as occurs in the customary open framed paddle.

While I have illustrated and described this wheel as a paddle wheel for boats, still it will be understood it can be used for other purposes such as a driving wheel for a shaft and in such an instance it will be understood that the water would be running water which will effect through its velocity the turning of the water wheel, it being necessary of course to properly direct the water to the paddles.

What I claim as my invention is:—

A water wheel comprising a hub having end flanges, a rim surrounding the hub and considerably narrower than the same, a framework connecting the rim to the flanges of the hub, side pieces secured to the frame work and inclosing the sides of the wheel and spaced pairs of paddles secured to the opposite sides of the wheel and extending inwardly from the rim and presenting each a trough shaped wing disposed at right angles to the side.

Signed at Winnipeg, this 18 day of June, 1918.

JOHN EDMOND WALLACE BRANAN.

In the presence of—
G. S. ROXBURGH,
K. B. WAKEFIELD.